United States Patent
Cho et al.

(10) Patent No.: US 6,636,496 B1
(45) Date of Patent: Oct. 21, 2003

(54) PACKET DATA COMMUNICATION DEVICE AND METHOD IN MOBILE COMMUNICATION SYSTEM

(75) Inventors: Dong-Ho Cho, Seoul (KR); Seong-Soo Park, Seoul (KR); Sun-Mi Kim, Seoul (KR); Hyeon-Woo Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/383,803

(22) Filed: Aug. 26, 1999

(30) Foreign Application Priority Data

Aug. 26, 1998 (KR) ........................................ 1998-35310

(51) Int. Cl.⁷ .............................................. H04B 7/216
(52) U.S. Cl. ...................... 370/335; 370/342; 370/441
(58) Field of Search ................................. 370/335, 338, 370/342, 401, 349, 468, 337, 441, 442, 443, 313, 329, 341, 431

(56) References Cited

U.S. PATENT DOCUMENTS 4,517,669 A * 5/1985 Freeburg et al. ............ 370/82
5,673,259 A * 9/1997 Quick, Jr. ................. 370/342
5,790,551 A * 8/1998 Chan ........................ 370/458
6,041,047 A * 3/2000 Diachina et al. ............ 370/321
6,078,572 A * 6/2000 Tanno et al. ............... 370/335
6,208,624 B1 * 3/2001 Tanno et al. ............... 370/280

FOREIGN PATENT DOCUMENTS

JP          04-068925        3/1992
JP          07-007764        1/1995

* cited by examiner

Primary Examiner—William Trost
Assistant Examiner—Meless Zewdu
(74) Attorney, Agent, or Firm—Dilworth & Barrese, LLP

(57) ABSTRACT

A method for controlling channel access in a mobile communication system. A base station generates a broadcast channel frame, which includes status information indicating whether channel codes which are changing in real time are occupied or not. The base station transmits the broadcast channel frame at predetermined intervals. Then, a mobile station selects an available channel code based on information from the received broadcast channel frame, generates a channel assignment request message, and transmits the channel assignment request message on a random access channel. Upon reception of the channel assignment request message on the random access channel, the base station assigns a channel, sets a transmission rate, and transmits the information on a forward access channel.

9 Claims, 12 Drawing Sheets

PACKET DATA COMMUNICATION DEVICE AND METHOD IN MOBILE COMMUNICATION SYSTEM

PRIORITY

This application claims priority to an application entitled "Packet Data Communication Device and Method in Mobile Communication System" filed in the Korean Industrial Property Office on Aug. 26, 1998 and assigned Serial No. 98-35310, the contents of which are hereby incorporated by reference.

BACKGROUND OF THE INVENTION

1. Field of the Invention

The present invention relates generally to a communication method in a mobile communication system, and in particular, to a method of communicating packet data between a base station and a mobile station, which maximizes channel access success probability and minimizes channel access failure probability and dynamically changes the transmission rate.

2. Description of the Related Art

The conventional mobile communication system uses an offset period channel access and a channel assignment message loaded in one radio frame in order to achieve random access delay. On the assigned signal channel, service quality information needed for providing the multimedia service is exchanged, and a traffic channel is assigned to accommodate this.

FIG. 1 illustrates the structure of a broadcasting channel (BCCH) on which a base station provides system information. This system information is used by mobile stations requesting access from the base station in a conventional mobile communication system.

The BCCH includes a pair of radio frames, each radio frame being 10 ms in duration. BI identifies a radio frame, TX POWER indicates a transmission power level, and SFN represents for a superframe number. 72 radio frames are grouped into one superframe and used for calculation of the phase of a reverse long code. UP INTERFERENCE denotes the amount of reverse interference, W indicates the start, continuation, and end of an upper frame for each frame unit of a physical layer, CRC is used to detects errors in each MAC (Medium Access Control) sublayer frame, and TA is tail bits for convolutional coding.

FIG. 2 illustrates the structure of a conventional random access channel frame structure. This channel is used by mobile stations to request assignment of a dedicated traffic channel or to transmit a small amount of user packet data.

Referring to FIG. 2, D indicates a dummy bit, U/C (User Traffic/Control Traffic) Field indicates whether the signal is a request for dedicated traffic channel assignment or transmission of small user packet data, TN is a termination node indicating whether the corresponding data is to be processed in a base transceiver sysem or a base station controller, S is a sequence number used to determined whether input frame data has already been received, and PID is a paging identifier (ID) which distinguishes a mobile station.

FIG. 3 illustrates the structure of a forward access channel frame on which a base station transmits a response message to a mobile station upon access by the mobile station in the conventional mobile communication system. In FIG. 3, PID is the ID of the mobile station whose access request is received in the base station.

FIG. 4 illustrates a conventional access procedure of a mobile station using the channels shown in FIGS. 1, 2, and 3.

Referring to FIG. 4, the mobile station synchronizes its timing to a base station, acquires the offset of the random access channel (RACH) to be accessed, and attempts to transmit signal traffic. Then, if no other mobile station attempts to transmit at the same offset, the base station receives the data on the random access channel, and transmits an acknowledgment on the next forward access channel (FACH). If the mobile station has not received an acknowledgement after a predetermined time period, the mobile station retries access in the $16^{th}$ slot.

The next-generation mobile radio communication system should ensure efficient performance of the random access method by the mobile station. To do so, the mobile radio communication system is required to minimize the time taken to receive an acknowledgment for an access request by reducing the access unit time, such as a time slot or a radio frame, and the amount of information transmitted during an access. An example is DSA++ (Dynamic Slot Assignment), a MAC protocol in which a channel access is attempted in mini-slots. Further, it is necessary to support as many random access channels as possible to minimize contention caused by concurrent access from a plurality of mobile stations.

Therefore, the channel access mechanism in the MAC protocol for radio multimedia service needs to increase the successful channel access rate by adding a reservation scheme to the conventional contention-based transmission scheme.

Further, to efficiently support the various Quality of Service (QoS) parameters required for multimedia traffic, radio channels should be dynamically managed. That is, a variety of traffics should be supported, such as CBR (Constant Bit Rate), RT-VBR (Real Time-Variable Bit Rate), VBR, and ABR (Available Bit Rate) over an ATM (Asynchronous Transfer Mode) network. Since dynamically varied traffic such as VBR should be supported in real time, a MAC sublayer must efficiently manage radio resources without signaling overhead.

The conventional mobile communication system cannot support multimedia traffic with a real-time-varying transmission rate because signal traffic must also be exchanged between layer-3 entities when a channel is to be additionally assigned during a service.

A channel access mechanism in a MAC protocol for radio multimedia service should support both contention-based transmission and reservation-based transmission. The conventional mobile communication system uses a slotted-ALOHA mechanism to implement channel access. A mobile station competitively requests assignment of a random access channel, and a base station assigns the channel when the base station acknowledges the access. In this case, access performance for supporting radio multimedia service is determined by the number of random access channels and the number of signal messages transmitted. To reduce delay in random access transmission, the conventional mobile communication system uses a channel access of an offset period and a channel assignment message which a single radio frame can accommodate. On the assigned signal channel, information about the QoS required to provide the multimedia service is exchanged and a dedicated traffic channel which can accommodate it is assigned. However, an additional exchange of signal messages is required to assign a new channel in a line mode service on a dedicated traffic channel in the conventional mobile communication system. This channel assignment and release procedure is difficult to implement in real time because it is executed by a layer-3 entity such as Radio Bearer Control (RBC).

SUMMARY OF THE INVENTION

It is, therefore, an object of the present invention to provide a method of assigning a channel in consideration of service quality and minimizing access contentions in a MAC sublayer in order to support multimedia service having various traffic characteristics in a mobile communication system which provides a packet data service.

It is another object of the present invention to provide a method of dynamically controlling a transmission rate according to the amount of transmission data during a service of a mobile communication system which provides a packet data service.

It is a further object of the present invention to provide a method of transmitting status information required for random access on a specific channel by a base station in a mobile communication system.

It is still another object of the present invention to provide a device and method for minimizing contention during channel access by a mobil station in a mobil communication system.

It is yet another object of the present invention to provide a device and method for dynamically controlling the transmission rate depending on the amount of data transmitted during data transmission in a mobile communication system.

To achieve these and other objects, there is provided a method for controlling channel access in a mobile communication system. A base station generates a broadcast channel frame, which includes status information indicating whether continuously changing channel codes are occupied or not, and transmits it at a predetermined interval. Then, a mobile station selects an available channel code based on information from the received broadcast channel frame, generates a channel assignment request message, and transmits the channel assignment request message on a random access channel. Upon reception of the channel assignment request message on the random access channel, the base station assigns a channel, sets a transmission rate, and transmits the information on a forward access channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

An embodiment of the present invention described below provides a more efficient multimedia service through transmission of information about channel status, control of mobile access probability, and dynamic channel management in a packet data service of a CDMA mobile communication system. That is, in a packet data service of the MAC sublayer of a mobile communication system, a variety of multimedia services are efficiently provided by a base station transmitting channel information on a broadcast channel and controlling access probability.

Before presenting a description of an embodiment of the present invention, it is to be appreciated that the hardware of the base station and the mobile station is the same as that of a base station and a mobile station in well-known mobile communication systems, and its description will be omitted.

Figure 1:
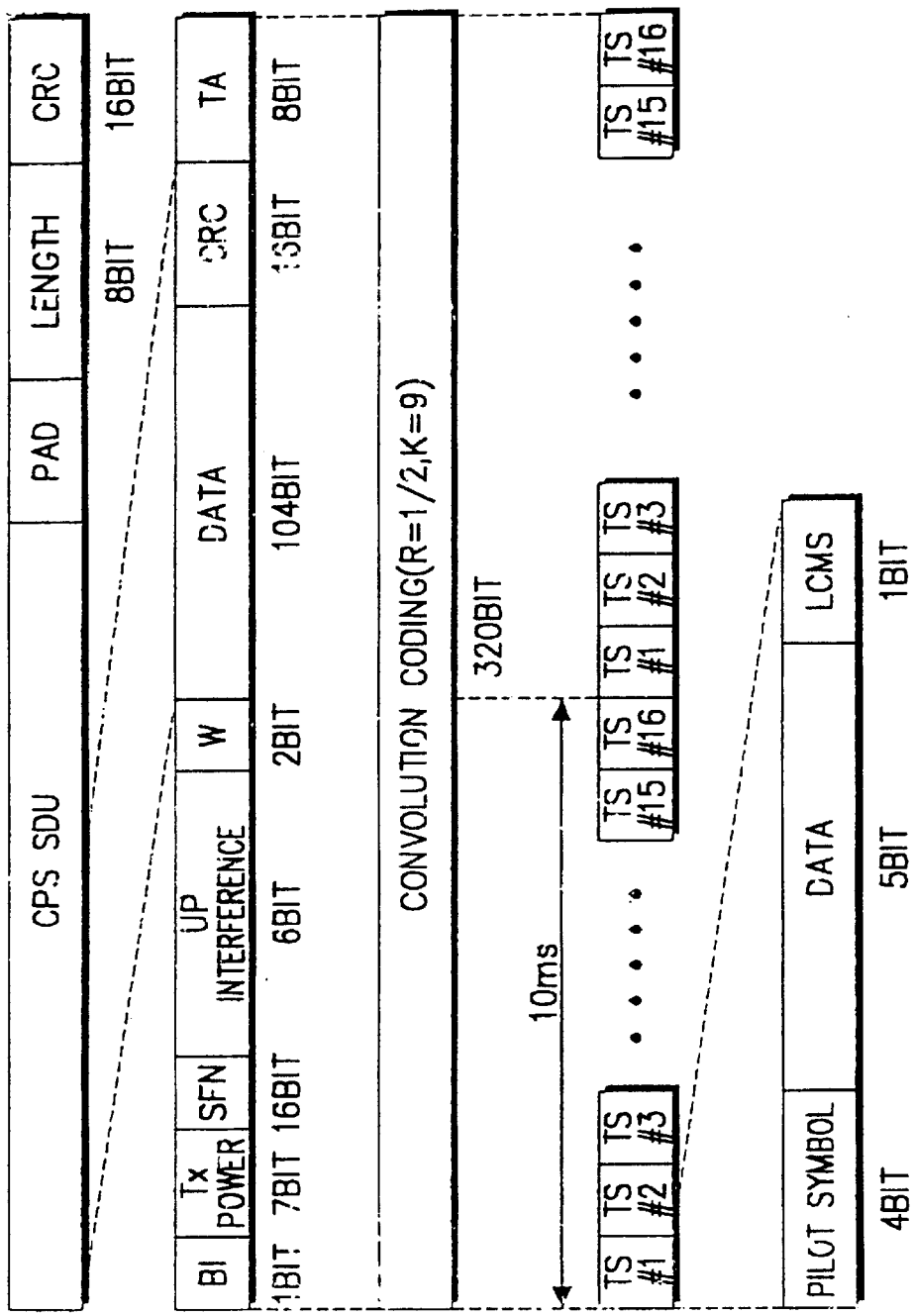
FIG. 1 illustrates the structure of a broadcast channel frame on which a base station provides system information to all the mobile stations within a cell.
Figure 2:
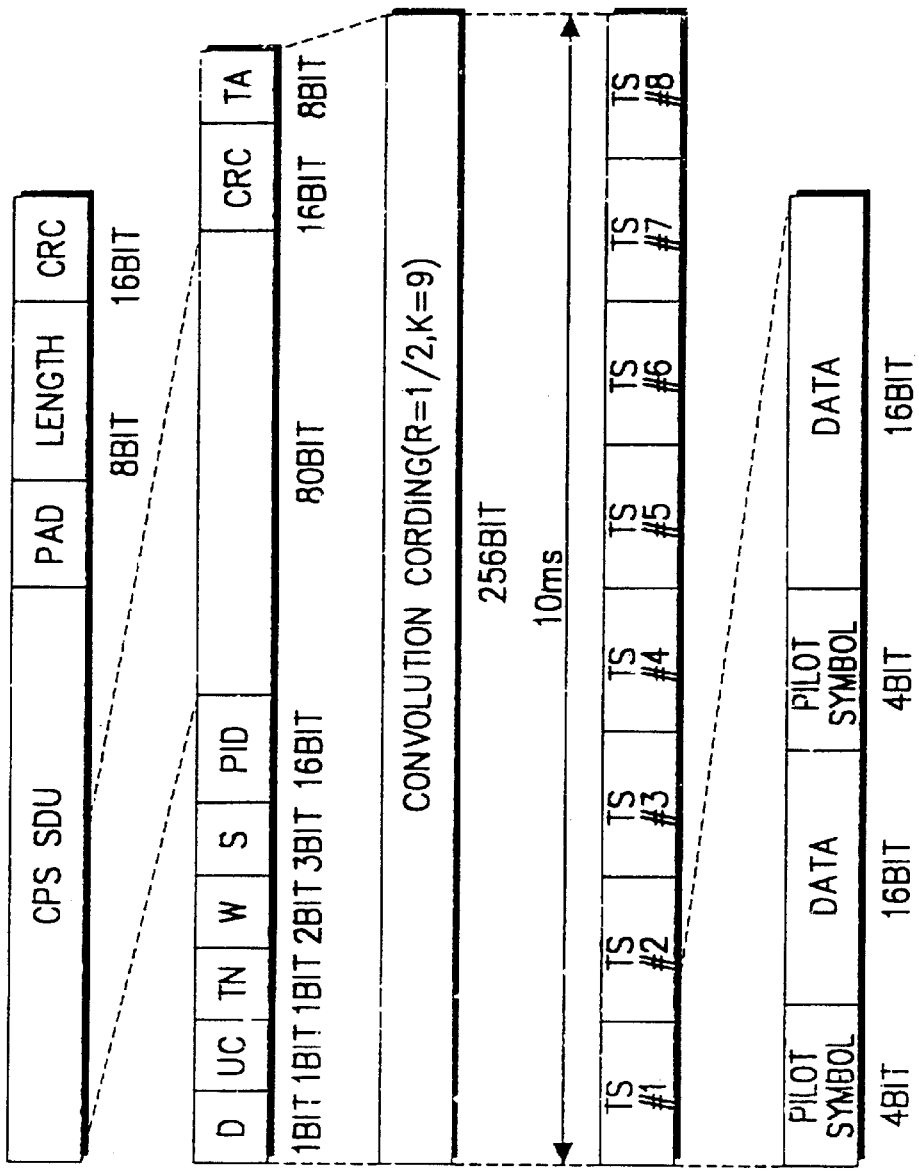
FIG. 2 illustrates the frame structure of a random access channel on which a mobile station accesses a base station according to the prior art.
Figure 3:
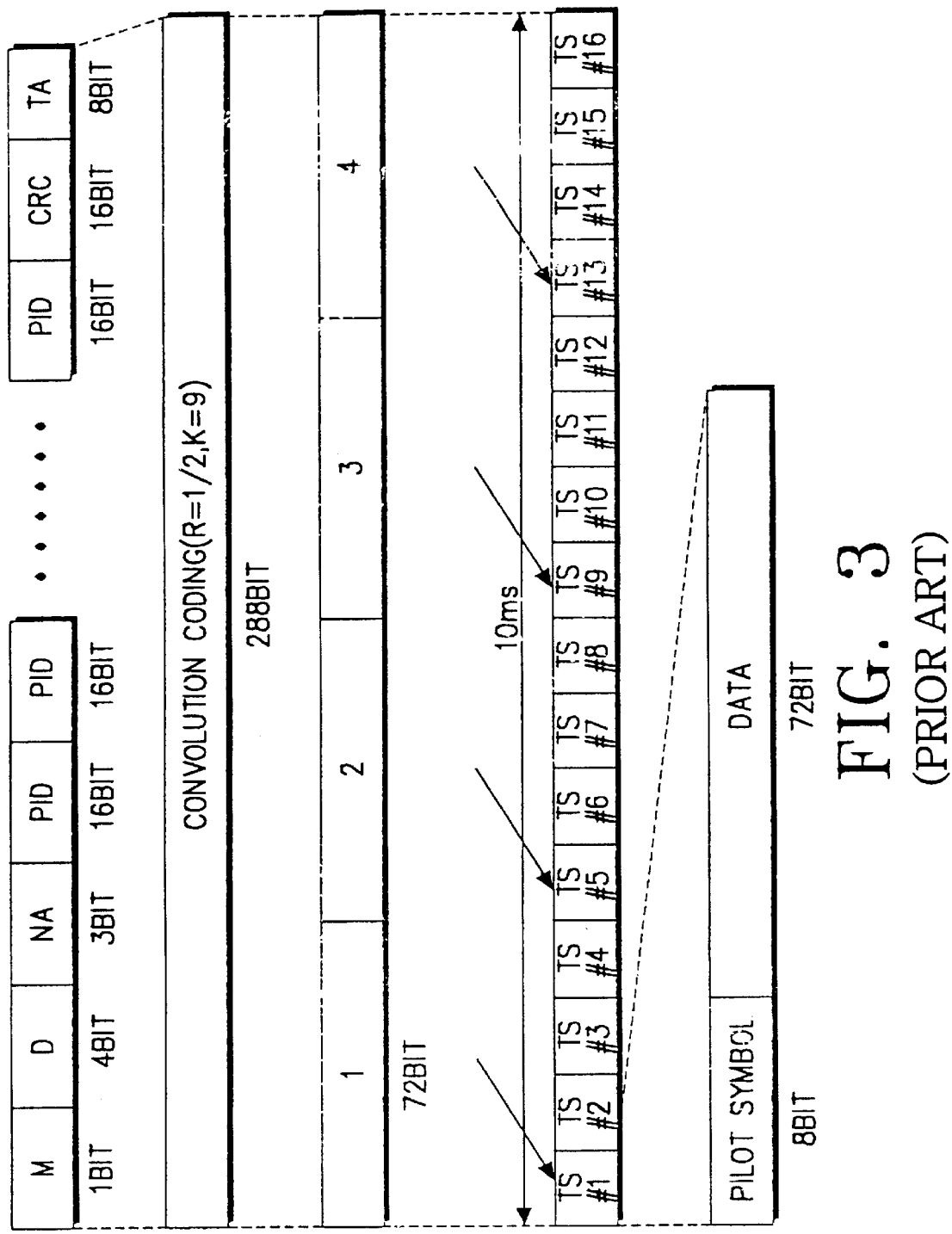
FIG. 3 illustrates the frame structure of a forward access channel on which a base station pages a mobile station within a cell or transmits an acknowledgment for a mobile access to the mobile station according to the prior art.
Figure 4:
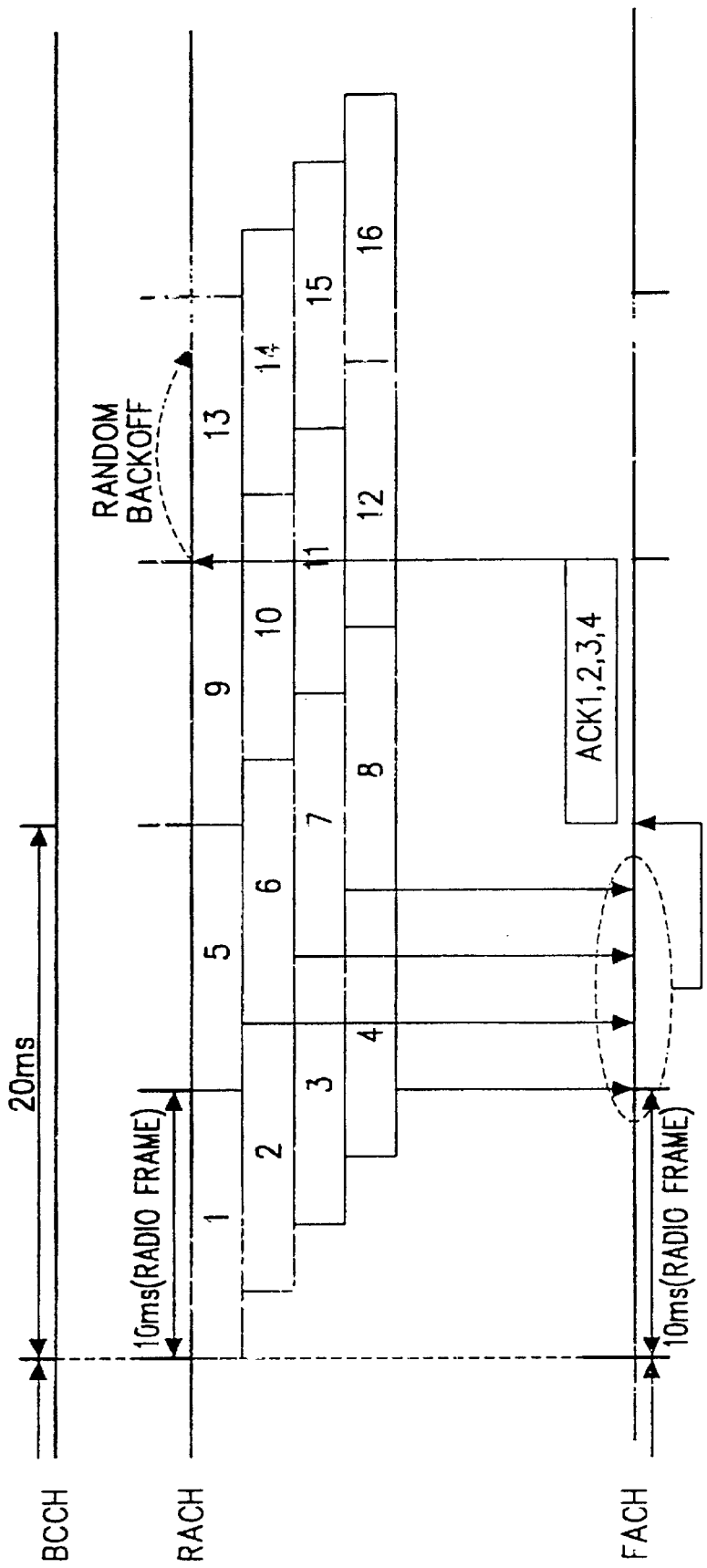
FIG. 4 illustrates a prior art procedure for requesting access to a base station by a mobile station.
Figure 5:
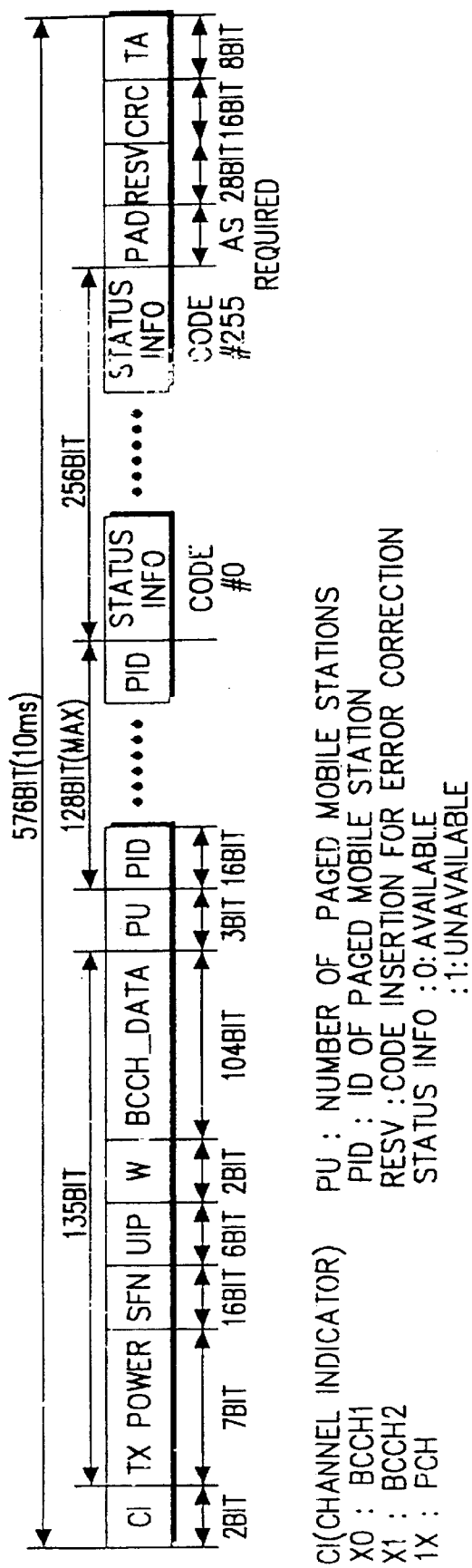
FIG. 5 illustrates the frame structure of a broadcast channel on which a base station provides channel code information as well as system information to all the mobile stations within a cell according to an embodiment of the present invention.

System information, the number of a code which can be randomly accessed, and a paging ID are transmitted on a BCCH. FIG. 5 illustrates the frame structure of a BCCH according to an embodiment of the present invention. The fields of a BCCH frame are as follows.

A/D and AR fields are used by a MAC protocol for dynamically executing assignment and release of an additional channel according to an embodiment of the present invention.

CI (Channel Indicator) indicates whether the 10 ms-BCCH radio frame includes information about BCCH1, BCCH2, or the PCH (Paging Channel) in a wide band CDMA system. Without PID for paging a mobile station in the BCCH frame, the CI is 00 or 01. It is assumed that if the CI is 00, BCCH1 information is provided, if the CI is 01, BCCH2 information is provided, and if the CI is 1X, PCH information is provided.

TX POWER represents the level of transmission power of the base station.

SFN is the number of a system frame for use in calculating the phase of a reverse long code and synchronizing a superframe.

UIP (Uplink Interference Power) represents a measurement of interference for each sector on the latest reverse link W denotes assembly and disassembly, that is, the start, continuation, and termination of a reverse frame.

BCCH_DATA includes system parameter information.

PU (Paged User) indicates the number of mobile stations which are paged in a corresponding frame by a base station.

PID identifies a call or a mobile station.

STATUS INFO is status information indicating whether available traffic channels 0 to 255 of a corresponding base station are in use or not.

PAD is used to maintain the length of a MAC frame at a constant value.

CRC is added to each MAC sublayer to detect errors, and it is determined in an upper-layer re-transmission protocol whether to retransmit data based on the error detection.

TA indicates tail bits for convolutional coding.

Figure 6:
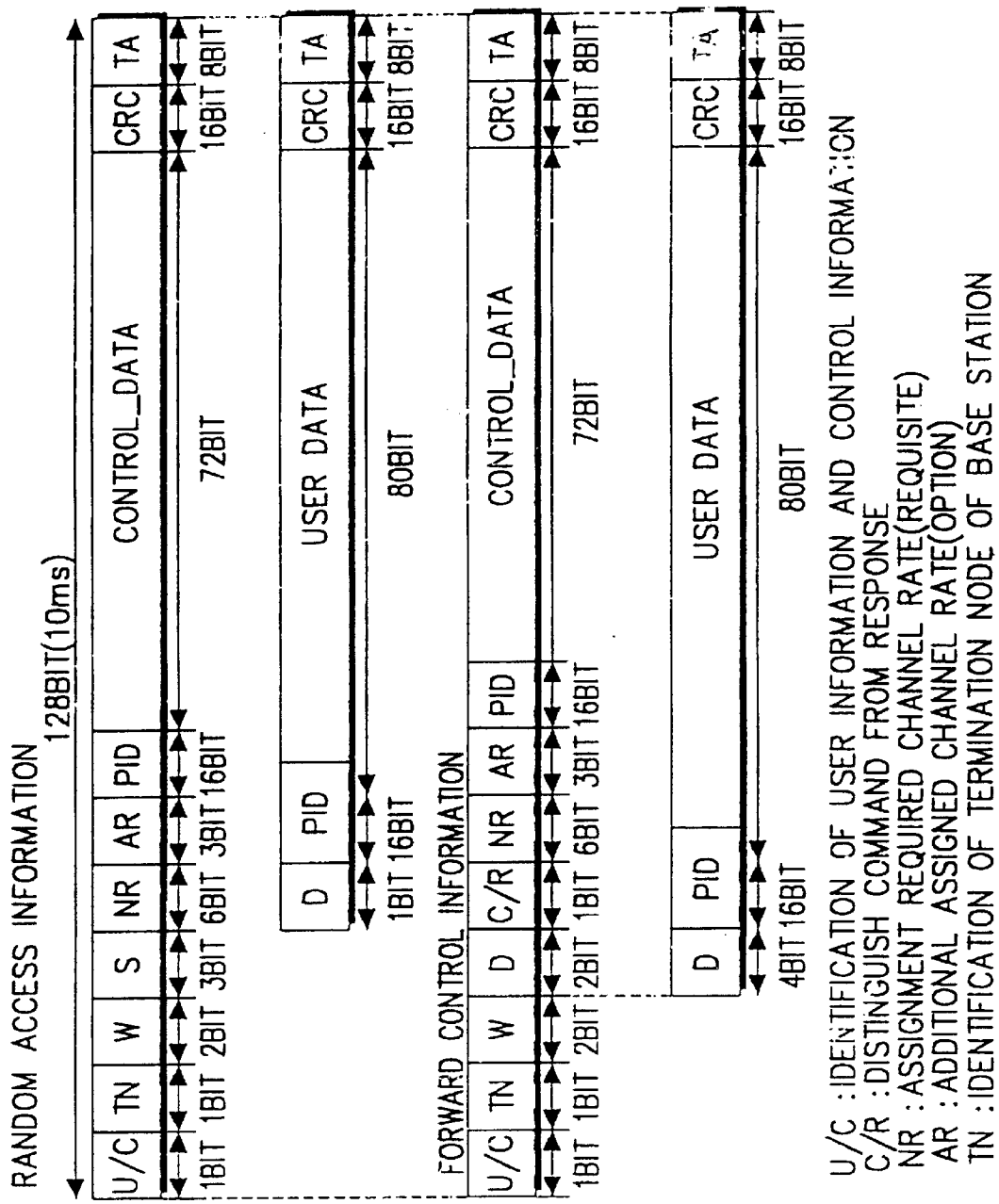
FIG. 6 illustrates the frame structure of a random access channel on which a mobile station attempts to access or transmit an intermittent service according to an embodiment of the present invention.

The mobile station receives a BCCH frame as shown in FIG. 5 from the base station, monitors information about an available channel, and requests assignment of a dedicated channel for traffic transmission on an available random access channel. In addition, the mobile station can support an intermittent data service by transmitting user data in a random access procedure. FIG. 6 illustrates the frame structure of a random access channel which supports random access and intermittent service.

Referring to FIG. 6, when the mobile station attempts a random access, it records in a U/C(User Traffic/Control Traffic) field whether the transmission data is user information or control information. It also records information about termination identification in a base station, information indicating whether a MAC SDU (Service Data Unit) continues, and the frame number to prevent repeated reception of a frame. If control information like a channel assignment request is to be transmitted, a NR (Necessary Rate) field and an AR (Additional Rate) field should be additionally set. The transmission rate of a channel which should be assigned to a mobile station for data transmission to a base station is set in 16 Kbps units in the NR field. In the AR field, the transmission rate of a channel which can be additionally assigned for variable band assignment should be set. If the mobile station sets the NR and AR to 0s, which implies it requests for a 16 Kbps channel only, additional channel assignment is not considered.

In the case of transmission of intermittent data, the U/C (User Traffic/Control Traffic) field is set to user data and the NR (Necessary Rate) and AR (Additional Rate) fields are not used. The C/R (Command Response) field is used as an ID to determine whether control information sent to the mobile station by the base station is an acknowledgment of a mobile request or a new command. If the control information is an acknowledgment, the NR is identical to the value demanded by the mobile station, and the AR is set to a value which can be additionally assigned by the base station.

Figure 7:
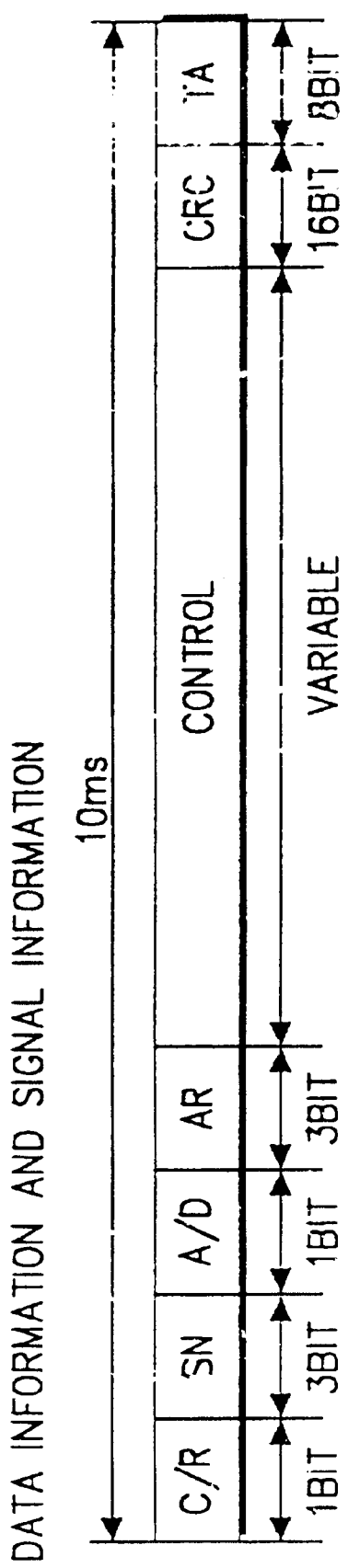
FIG. 7 illustrates the frame structure of a data transmission channel for adding/releasing a channel during service according to an embodiment of the present invention.

Upon reception of an acknowledgment of channel assignment from the base station, the mobile station transmits data on the corresponding channel. If it is for multimedia service, variable bit transmission should be supported. To do so according to an embodiment of the present invention, a MAC protocol for assignment and release of an additional channel is dynamically executed by use of the A/D (Add/Drop) and AR(Additional Rate) fields. FIG. 7 illustrates a frame structure for data transmission according to an embodiment of the present invention.

If a transmission rate is to be changed with respect to a current assigned channel band, a channel band indicated by the AR field is additionally assigned or released. In this case, the C/R (Command/Response) and SN (Sequence Number) fields are used to confirm assignment and release of a channel between the base station and the mobile station.

With reference to FIGS. 8 through 12, a description of a communication between a base station and a mobile station in a mobile communication system will be given.

Figure 8:
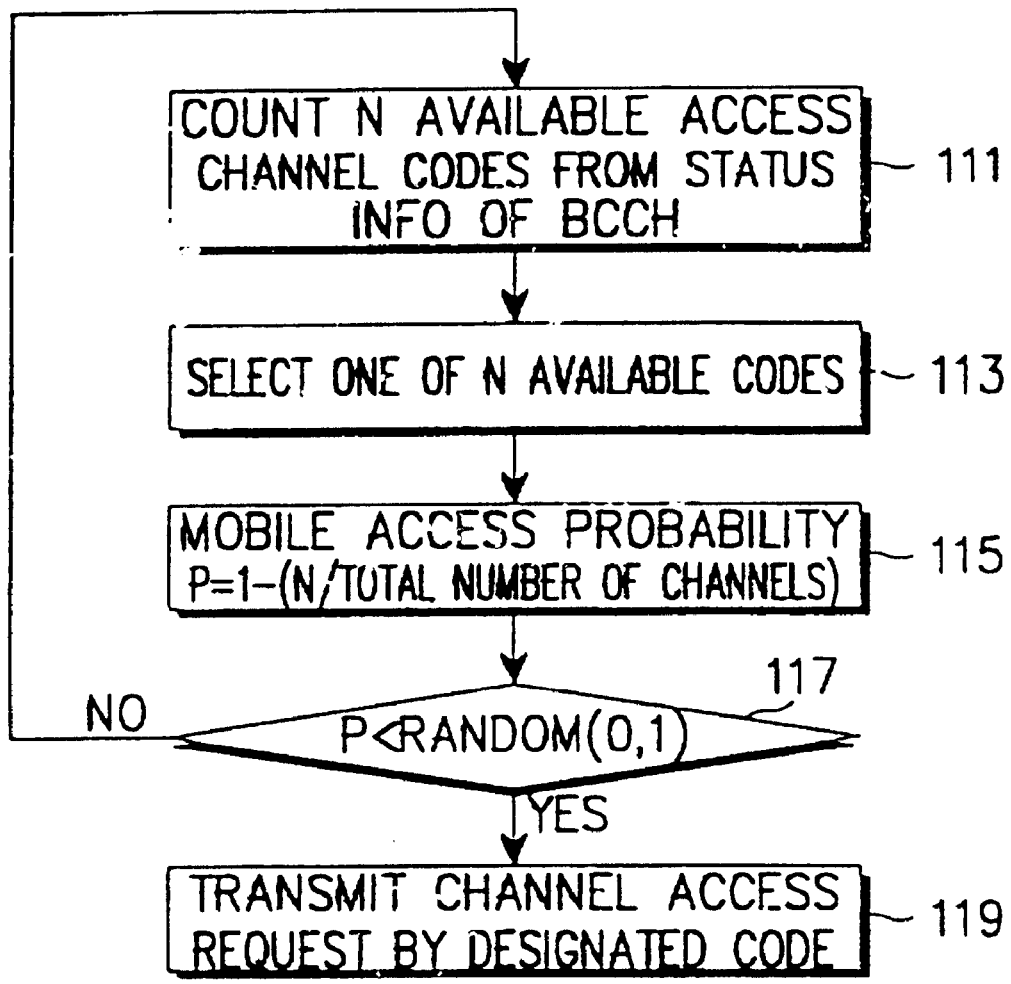
FIG. 8 illustrates an access channel determining procedure in which a mobile station determines whether to perform an access attempt based on information about the status of a broadcast channel and access probability according to an embodiment of the present invention.

FIG. 8 is a flowchart depicting a channel access determining procedure in a mobile station according to an embodiment of the present invention.

Referring to FIG. 8, upon reception of a BCCH frame configured as shown in FIG. 5, a mobile station counts N available access channel codes by analyzing STATUS INFO of the BCCH in step 111. After the mobile station selects one of the N available access channel codes in step 114, it calculates an access probability P in step 115. The probability is calculated by P=1−N/total number of channels. Then, the mobile station attempts a channel access in step 117, and if the channel access is successful, it transmits a channel access request with a designated code in step 119.

First, the mobile station adapts itself to the system situation by continuously receiving broadcast information from the base station in an active state. The information sent on a BCCH by the base station includes a system parameter, PID, and STATUS INFO. Then, the mobile station applies the system parameter to system operation. Here, if the frame data of the BCCH includes the PID of the mobile station, which implies that the mobile station is paged from the network, the mobile station attempts a channel access. When the mobile station requests channel assignment for paging, the mobile station NR and AR fields indicating a required assigned band and an additional assigned band respectively are both set to 0 because the mobile station does not know a band for processing traffic.

Therefore, the mobile station obtains the number of available codes and code values based on the STATUS INFO of the BCCH received from the base station and randomly selects one of the available codes. If channel access is required upon call origination, the mobile station determines whether to access or not by calculating an access probability. If the access is rejected by the access probability, the mobile station repeats the channel code selection procedure on a BCCH.

Figure 9:
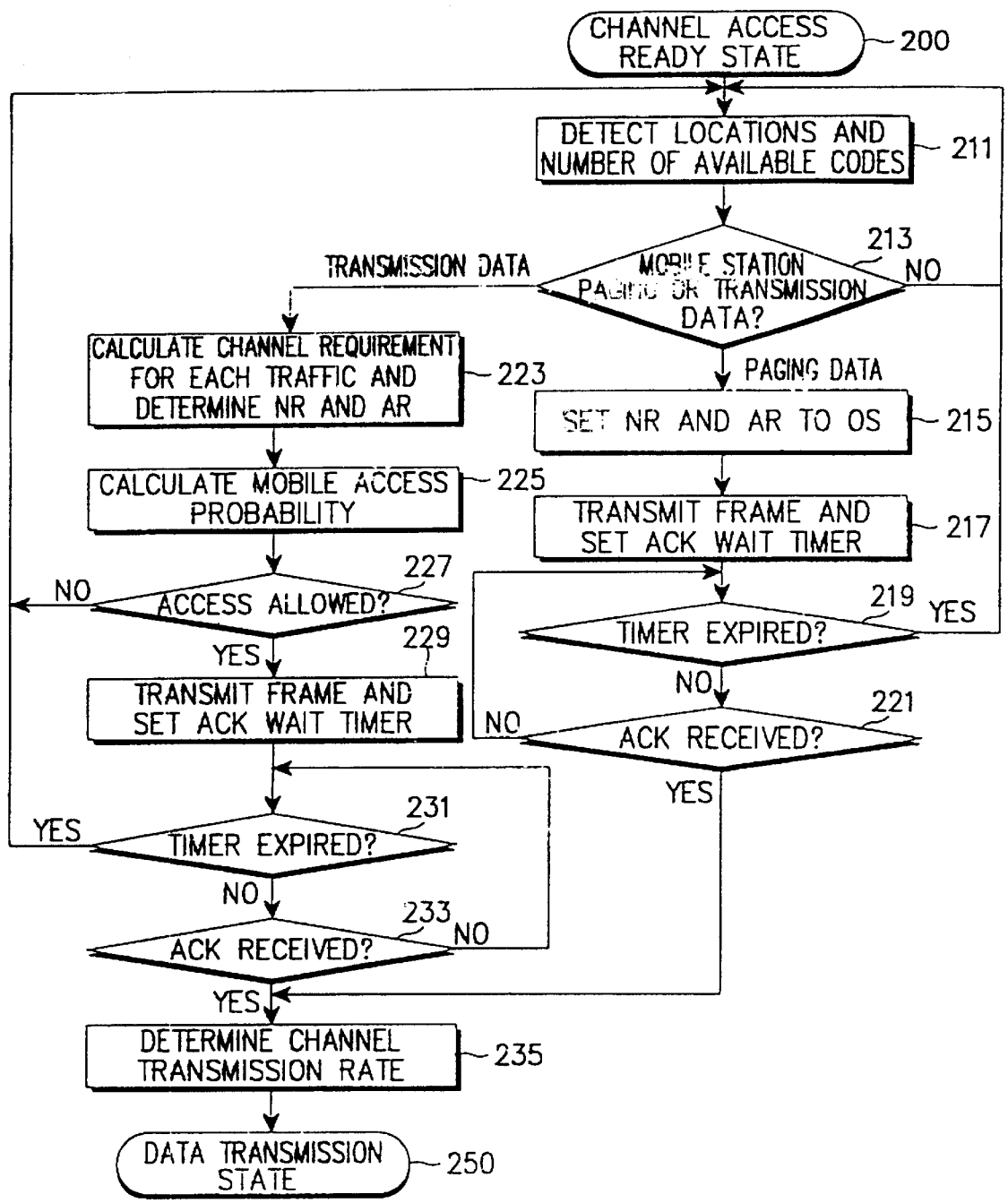
FIG. 9 illustrates a mobile channel access procedure according to an embodiment of the present invention.

FIG. 9 illustrates a mobile channel access operation according to an embodiment of the present invention.

Referring to FIG. 9, upon reception of frame data on a BCCH in a channel access ready state in step 200, the mobile station detects the locations and number of available codes from the BCCH frame data in step 211 and determines whether there is paging data or transmission data for the mobile station in step 213. In the presence of the paging data (that is, the ID of the mobile station is designated by the PID of the BCCH frame as shown in FIG. 5), the mobile station sets the NR and AR fields of an access channel frame as shown in FIG. 6 to 0s in step 215, constructs the access channel frame for transmission and activates an acknowledgment wait timer for counting the reception time of an acknowledgment from the base station in step 217. Then, the mobile station determines whether an acknowledgment has been received from the base station within the timer sequence in steps 219 and 221 and, if the acknowledgment has not been received within the timer sequence, the procedure returns to step 211. Otherwise, the mobile station determines a transmission rate for a channel in step 235 and goes to step 250 for data transmission.

In the presence of data to be transmitted in step 213, the mobile station calculates the channel requirement for traffic and determines NR and AR values of an access channel frame as shown in FIG. 6, in step 223. In step 225, the mobile station calculates an access probability and determines whether an access is allowed or not in step 227. If the access is allowed, the mobile station constructs an access channel frame as shown in FIG. 6, transmits the access channel frame, and activates an acknowledgment timer in step 229. In steps 231 and 233, the mobile station determines whether the acknowledgment has been received within the sequence of the acknowledgment wait timer. If the acknowledgment has not been received within the time period, the procedure returns to step 211. Otherwise, the mobile station determines a channel transmission rate in step 235 and goes to step 250.

As described above, for channel access, the mobile station transmits a channel assignment request, activates an acknowledgment wait timer, and waits for an acknowledgment. If the mobile station fails to receive the acknowledgment before the timer expires, the channel assignment request is repeated. Otherwise, the mobile station determines a transmission rate by a corresponding code and performs data transmission.

Figure 10:
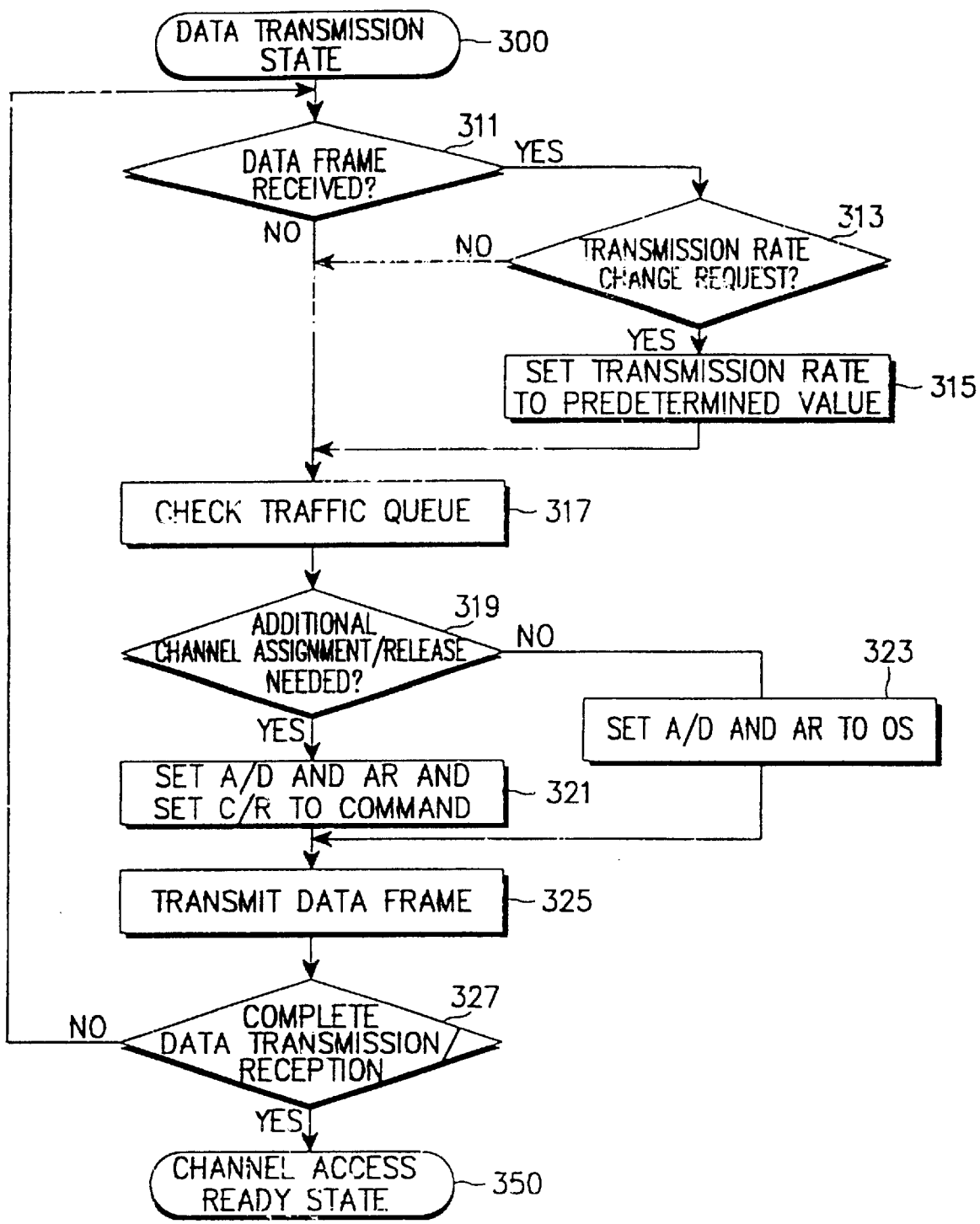
FIG. 10 illustrates a mobile data transmission procedure after a successful access attempt according to an embodiment of the present invention.

FIG. 10 is a flowchart depicting a data transmission procedure in a mobile station according to an embodiment of the present invention.

Referring to FIG. 10, a data transmission state is entered in step 300. The mobile station determines whether data has been received in step 311. Upon reception of data, the mobile station determines whether there is a request for changing a transmission rate in step 313. Upon a request for changing the transmission rate, the mobile station sets the transmission rate to a predetermined value in step 315. If no data frames have been received in step 311, or there is no request for changing a transmission rate in step 313, and after step 315, the mobile station checks the state of the traffic queue in step 317. In step 319, the mobile station determines whether a channel should be additionally assigned or released based on the state of the traffic queue. If it is necessary to additionally assign or release a channel, the mobile station sets the value of A/D and AR of a data transmission frame as shown in FIG. 7 and designates a command in a C/R field, in step 321. Otherwise, the mobile station sets the values of A/D and AR of the data transmission frame to 0s in step 323. Then, the mobile station constructs a data transmission frame as shown in FIG. 7 in step 325. Upon completion of data transmission/reception in step 327, the mobile station enters a channel access ready state in step 350.

As described above, queue control is implemented depending on the characteristic of traffic to support various traffic characteristics such as CBR, RT-VBR, VBR, and ABR. The size of the transmission queue is adjusted according to the transmission rate of a channel. If buffer queues of VBR and ABR traffic exceed a predetermined size, a request for additional channel assignment is issued. Then, the values of fields A/D, AR, and C/R are set and data frames are transmitted. If there is no need for additional channel assignment, the A/D and AR are set to 0s so that the transmission rate is not changed.

Figure 11:
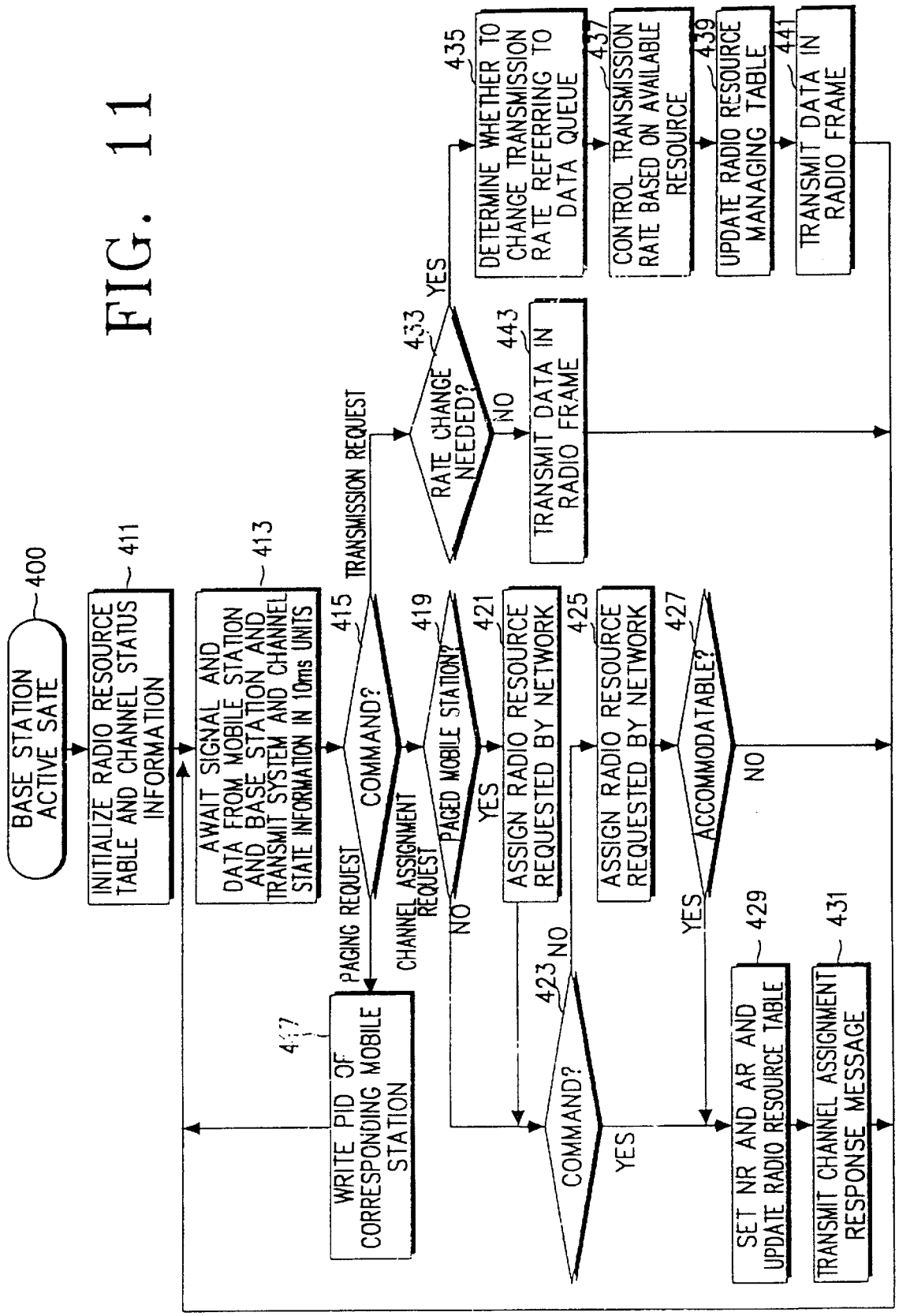
FIG. 11 illustrates a base station operation of providing system information and information about an available channel on a broadcast channel, notifying paging information and the success of a mobile access on a forward access channel, and determining whether to add or release a channel on a data transmission channel according to an embodiment of the present invention.

FIG. 11 is a flowchart depicting an operation of paging, channel assignment, and transmission in a base station upon a mobile station request according to an embodiment of the present invention.

Referring to FIG. 11, the base station is placed in an active state in step 400. The base station initializes the radio resources management table and channel state information in step 411. In step 413, the base station awaits generation of a message to be transmitted to a mobile station or reception of a signal or data. The base station also transmits system information and channel state information configured as shown in FIG. 5 on a BCCH every 10 ms interval in step 413. After transmitting the BCCH frame, the base station analyzes a required command in step 415. If the command is a paging request in step 415, the base station writes the ID of the corresponding mobile station in the PID field of the BCCH frame and increments the value of the PU field, in step 417. Then, the procedure returns to step 413.

If the command is a channel assignment request in step 415, the base station determines whether the channel assignment request is issued by a mobile station in step 419. If it is, the base station assigns the radio resource requested by the network in step 421. If the channel assignment request is autonomously generated by the base station in step 419, or after step 421, the base station determines whether the requested channel is available in step 423. If it is not available, the base station designates the requested radio resource base on available resource in step 425 and determines whether the designated radio resource can be accommodated in step 427. If the requested channel is available in step 423 or the designated radio resource can be accommodated in step 427, the base station sets the values of NA and AR and updates the radio resource table in step 429, transmits a channel assignment response message in step 431, and returns to step 413 where the channel assignment request operation ends.

If the required command is a transmission request in step 415, the base station determines whether a transmission rate is to be changed in step 433. If there is no need for changing the transmission rate, the base station transmits data in a radio frame in step 443 and returns to step 413. However, if there is a need to change the transmission rate, the base station determines whether it is necessary to change the transmission rate by referring to a data queue in step 435, checks the transmission rate based on available resource in step 437, updates the radio resource management table in step 439, transmits data in a radio frame in step 441, and returns to step 413.

To support high-speed transmission of the radio channel, a plurality of codes which support a basic transmission rate are assigned in combination to implement one transmission. In this case, the code actually used for transmission is the same as that for mobile channel access and, as far as an additionally assigned band is concerned, the state of available codes in a radio resource table is changed by the assigned amount so that transmission capacity is adjusted. The base station transmits system parameters, paging information, and channel state information to a mobile station on a BCCH at 10 ms intervals. For paging the mobile station, the base station writes the PID of the corresponding mobile station in the BCCH, activates an acknowledgment wait timer, and waits for a channel assignment request from the mobile station. If the timer expires, the base station re-pages the mobile station.

Upon reception of the channel assignment request from the mobile station, the base station determines whether the mobile station that has issued the request is the paged one. If the channel assignment request command is a response to the paging message, the base station assigns a radio resource that satisfies the QoS required by the network. However, if the request is not a response to the paging, the base station determines whether the radio resource requested by the mobile station is available. If the radio resource request can be sufficiently accommodated, the base station adjusts the amount of the requested radio resource, assigns a channel, and sends the assigned radio resource to the mobile station. If the radio resource request cannot be sufficiently accommodated, the base station neglects the channel assignment request of the mobile station and takes no action.

In a data transmission state, the base station can re-adjust the rate of a transmission channel referring to a transmission queue upon a mobile station request for changing a transmission rate. The transmission rate is changed by adjusting the channel band assignments based on a radio resource table.

Figure 12:
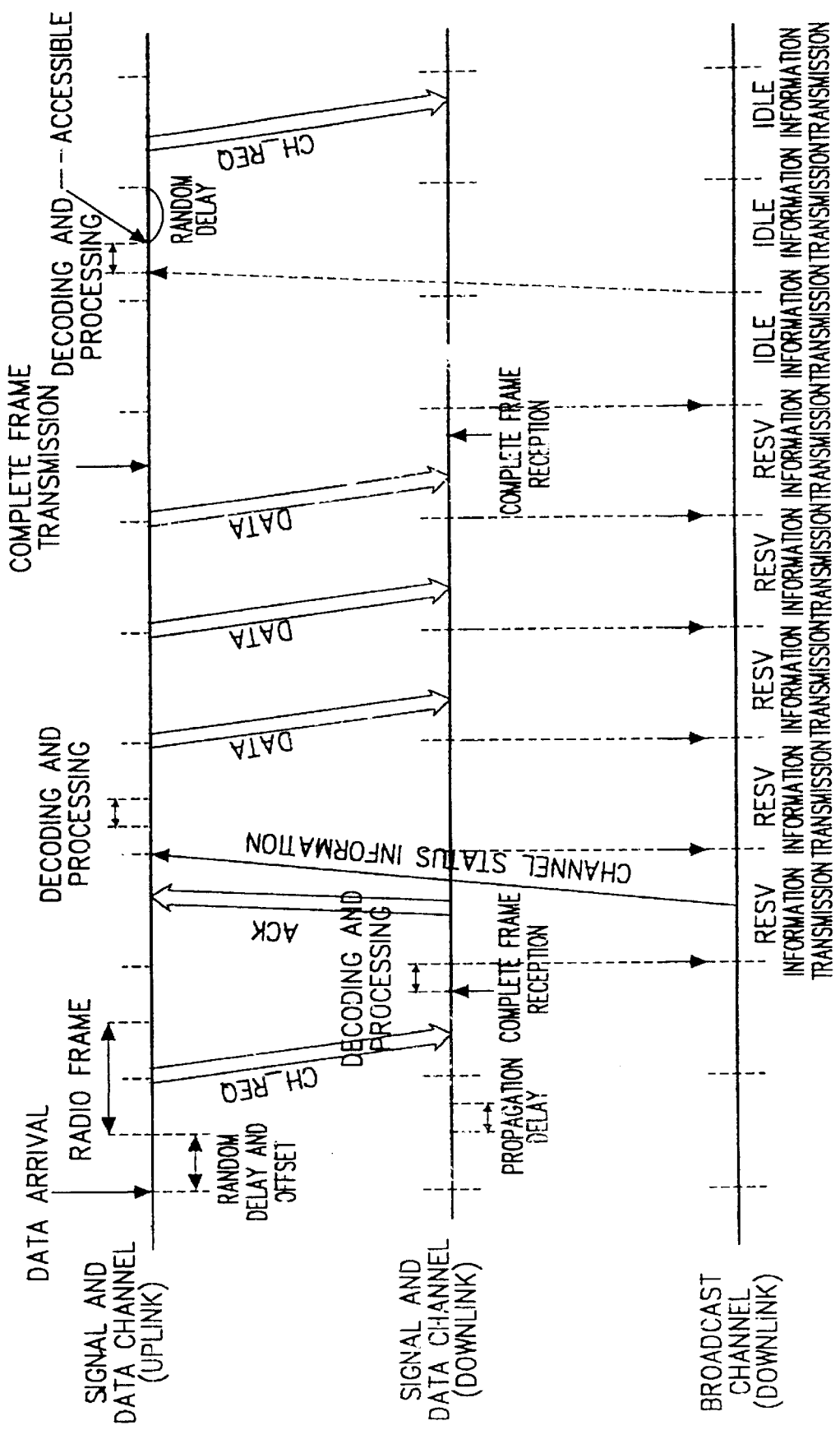
FIG. 12 illustrates a mobile random access procedure upon reception of information about an available channel code on a broadcast channel according to an embodiment of the present invention.

FIG. 12 illustrates random access and data transmission between a base station and a mobile station according to an embodiment of the present invention.

Referring to FIG. 12, the base station continually transmits information about the real time state of channel codes on a BCCH. Upon reception of the BCCH from the base station, the mobile station attempts to access a channel based on information about a paged mobile station and channel state information. Upon reception of a channel access request message, the base station transmits an acknowledgment to the mobile station and then the mobile station starts to transmit data.

The BCCH includes significant parameters related to system operation, and the mobile station determines whether it is paged by analyzing the PID of the BCCH. The STATUS INFO of the BCCH indicates whether one of the 256 channels is available. When the mobile station detects available codes, it selects one of the available codes after a random delay, transmits a channel assignment request, and starts a random access.

Upon reception of a channel access request message on a random access channel from the mobile station, the base station extracts data information through decoding. Here, in the case that there are sufficient available channels and the mobile channel request can be accommodated, the base station transmits control information about the forward link to the mobile station in a next slot period. The forward link control information includes information associated with channel assignment. Further, the base station sets STATUS INFO of the BCCH frame to indicate that the assigned code is in use. If the base station cannot accommodate the mobile channel assignment request, the base station neglects the channel assignment request of the mobile station and maintains STATUS INFO of the BCCH frame to represent that the requested channel is available.

Upon reception of an acknowledgment of the channel assignment from the base station, the mobile station determines the rate of a corresponding channel according to a channel transmission rate included in the acknowledgment. If the mobile station fails to receive the acknowledgment within a predetermined time, the mobile station considers that a contention has occurred and re-attempts a channel access after a random delay. In the re-attempt for channel access, the mobile station transmits data frames using the same code value used in the random access. Since a transmission channel can be additionally assigned and released during a data frame transmission when the base station and the mobile station intend to, channels can be dynamically managed.

A description of multimedia service operation in a MAC sublayer of a mobile communication system will be given below.

First, each mobile station should satisfy characteristics and requests of various traffic classes used in a multimedia service. Multimedia traffic is implemented at CBR, RT-VBR, VBR, and ABR. While the CBR and RT-VBR traffic allows cell loss and errors at or below a predetermined level, it is less tolerant of delay. Therefore, since the VBR is fixed during a service in assignment of a bandwidth, it should satisfy a peak rate. In addition, the RT-VBR should ensure a mean rate. The ABR is free of delay limitations but does not allow traffic loss or errors.

According to the characteristics of the traffic, 8 Kbps PCM coding is assumed for voice and VBR packet data transmission at 2.4 Kbps is assumed to be in ABR traffic. A transmission rate in a high-speed period is four times larger than that in a low-speed period in RT-VBR or VBR traffic. Moving pictures are transmitted at an average of 8 Kbps in the RT-VBR or VBR traffic. A request for channel assignment by each mobile station is transmitted in a radio frame of 10 ms in duration and it is assumed that the time required to process a message, for example, for message generation, encoding, decoding, and radio resources management is 2.5 ms or below.

To analyze transmission performance in a channel environment where voice and data coexist in the embodiment of the present invention, voice traffic and data are mapped to CBR traffic and ABR traffic, respectively. Here, it is assumed that a mobile station supports one of voice or data service and the number of mobile stations supporting data service is the same as that of mobile stations supporting voice service.

Data transmission can be considered in two ways: transmission on a traffic channel and transmission on a packet channel. When transmitting data with limited channels shared by data mobile stations and voice mobile stations, the use efficiency of a channel for data service is better in a packet scheme than in a line scheme. In the case that a data mobile station transmits data on a packet channel, more available channels can be assigned with respect to CBR traffic. Thus, as the number of mobile stations increases, good performance is exhibited in terms of the blocking rate of voice traffic. An embodiment of the present invention provides a mechanism of applying a mobile access probability and broadcasting status information of a reverse channel for packet transmission, taking the advantages of packet transmission. Hence, the blocking rate of voice traffic when the number of mobile stations increases is relatively low in the present invention.

Second, as far as time delay of a data frame in the same environment is concerned, data transmission in the line scheme shows a lower channel efficiency than that in the packet scheme. Therefore, as the number of mobile stations increases, the average delay of data traffic is rapidly increased. Due to the increase of the mobile stations, as traffic density on a channel increases to full density, performance is good in the embodiment of the present invention. This is because contention-caused access re-attempts are reduced in an embodiment of the present invention, as compared to the NTT method, in a channel access procedure for data transmission.

Third, the present invention is better adapted to real time traffic having a variable band like moving pictures than NTT DoCoMo W-CDMA. A channel should be assigned in such a way that a peak rate is supported, when transmitting VBR traffic. To do so, though a channel band can be assigned based on a peak data rate, this method causes inefficiency during periods other than burst periods. Accordingly, a band is assigned based on average transmission rate in VBR transmission, and a band is additionally assigned for burst transmission. For the purpose of additional band assignment in W-CDMA, a request for assignment of an additional band to a current channel is transmitted on a signaling channel and the an embodiment of the present invention allows a band to be additionally assigned by setting a corresponding field during a traffic transmission.

Fourth, the present invention shows a better performance than W-CDMA in terms of CBR blocking rate, RT-VBR processing rate, and ABR delay. These are caused by call blocking incurred during mobile channel access. In an embodiment of the present invention, the probability of contention is minimized by allowing all available channels to be used as access channels and through an access probability of a mobile station when the number of available channels decreases. Thus, the blocking probability of CBR traffic is relatively low. In addition, real time transmission is ensured by adjusting the amount of ABR traffic to be transmitted to achieve some level of performance of RT-VBR traffic by priority scheduling. Conversion of channels to other uses ensures excellent performance since it can satisfy real time requirement with respect to RT-VBR traffic. Furthermore, a rapid increase in ABR traffic delay can be prevented by transmitting ABR traffic during an RT-VBR non-burst period.

In accordance with the present invention, a base station informs a mobile station of channel status-information required for mobile access on a BCCH in advance in a mobile communication system which provides packet data service. Therefore, the probability of access contention is reduced. In addition, a method is provided in which traffic channel can be allocated to satisfy various traffic types. In addition, a mechanism is provided in which a data transmission rate can be changed during service, so that the QoS of multimedia service with various traffic characteristics can be satisfied.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for establishing a channel between a mobile station and a base station in a mobile communication system, the system comprising the steps of:
   generating a broadcast channel frame including status information indicating whether channel codes are occupied or not, the status of channel codes changing in real time;
   transmitting said broadcast channel frame every predetermined time period by a base station;
   receiving, at a mobile station, the broadcast channel frame at the time period;
   selecting an available channel code based on information in the received broadcast channel frame;
   determining whether an access is allowed or not by calculating access probability;
   generating a channel assignment request message when the access is allowed,
   transmitting the channel assignment request message on a random access channel by a mobile station; and
   assigning, at the base station, the channel code selected by the mobile station on a forward access channel, upon reception of the channel assignment request message on the random access channel.

2. The method of claim 1, wherein the broadcast channel includes information about the identification of the broadcast channel, a number of mobile stations paged in the broadcast channel frame, identifications of the paged mobile stations, and a state of the codes of unoccupied traffic channels.

3. The method of claim 1, wherein the mobile station determines whether there are unoccupied channel codes by checking information about states of channel codes from the broadcast channel, selects one of the unoccupied channel codes to be the access channel if there are unoccupied channel codes, and transmits the channel assignment request message on the access channel, to thereby attempt to access a channel.

4. A device for controlling channel access in a base station in a CDMA communication system, comprising:
   a broadcast channel transmitter for transmitting, to mobile stations within a transmission region of the base station, a broadcast channel frame on a broadcast channel at predetermined intervals, said broadcast channel frame providing real-time updating of information including identifications of paged mobile stations and changing states of a plurality of channel codes;
   a reverse common control channel receiver for receiving a channel assignment request message from a mobile station; and
   a forward common control channel transmitter for generating an acknowledgment message including assignment of a channel corresponding to said channel assignment request message and a transmission rate.

5. The device of claim 4, wherein said reverse common control channel receiver receives a random access channel and the forward common channel transmitter transmits a forward access channel.

6. A device for controlling channel access in a mobile station in a CDMA communication system, comprising:
   a broadcast channel receiver for receiving a broadcast channel frame on a broadcast channel at predetermined intervals, said broadcast channel frame including information about states of a plurality of channel codes, the states of channel codes changing in real time;
   a random access channel transmitter for analyzing said broadcast channel frame information, selecting an available channel code based on the received broadcast channel frame information when the mobile station needs a channel code to use, generating an channel assignment request message, determining whether an access is allowed or not by calculating access probability, and transmitting the channel assignment request message when the access is allowed; and
   a forward access channel receiver for receiving information about channel assignment and transmission rate on a forward access channel.

7. A method for controlling channel access in a base station in a CDMA communication system, comprising the steps of:

generating a broadcast channel frame including information about identifications of paged mobile stations and states of a plurality of channel codes, said broadcast channel frame being updated in real time;

transmitting said broadcast channel frame on a broadcast channel at predetermined intervals;

receiving a channel assignment request from a mobile station, said channel assignment request including a request for channel assignment and transmission rate;

generating an acknowledgment message including requested channel assignment and transmission rate; and transmitting said acknowledgment message on a forward access channel.

8. The method of claim 7, further comprising the steps of:

receiving a request from a mobile station for changing the transmission rate;

controlling the transmission rate by analyzing the available channels; and transmitting information about the controlled transmission rate.

9. A method for controlling channel access in a mobile station in a CDMA communication system where a base station generates a broadcast channel frame including information about states of a plurality of channel codes, the states of channel codes changing in real time, and transmits said broadcast channel frame on a broadcast channel, the method comprising the steps of;

receiving the broadcast channel frame at a predetermined time period;

counting a number of available channel codes based on the status information in said broadcast channel frame receiving from said base station;

selecting of the available codes for data to be transmitted;

generating a channel assignment request message including the selected code;

determining whether an access is allowed or not by calculating access probability; and transmitting the channel assignment request message on an access channel when the access is allowed.

* * * * *